Sept. 23, 1930.                I. AMUNDSEN                 1,776,744
                              REFRIGERATING PLANT
                           Original Filed Oct. 29, 1926
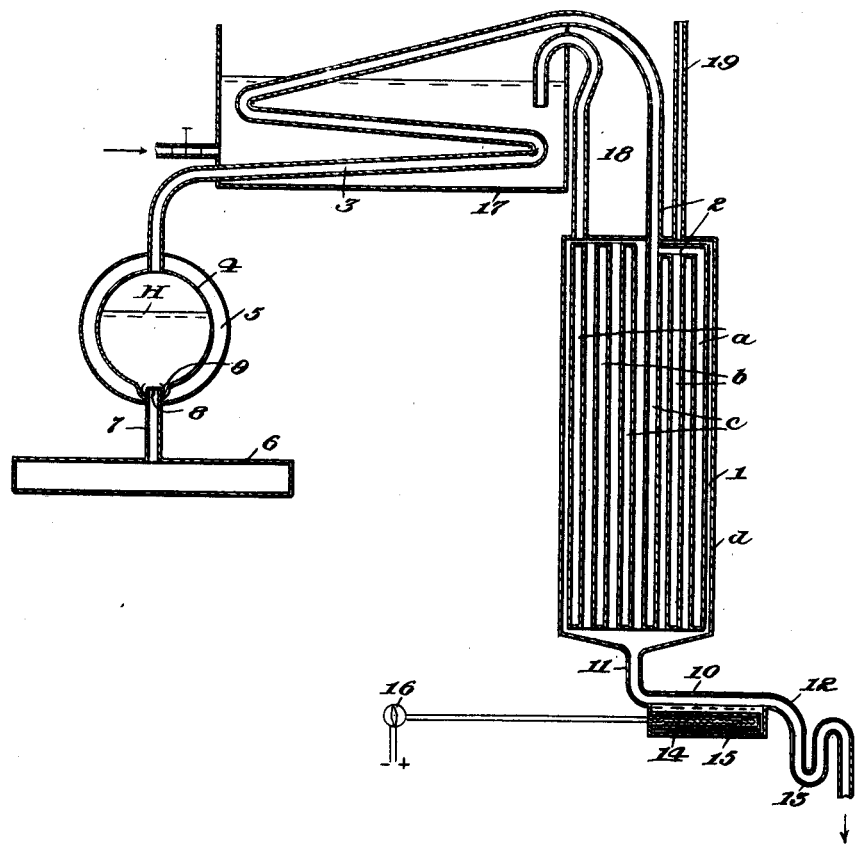
Inventor:
I. Amundsen, Patented Sept. 23, 1930

1,776,744

UNITED STATES PATENT OFFICE

IVAR AMUNDSEN, OF OSLO, NORWAY

REFRIGERATING PLANT

Original application filed October 29, 1926, Serial No. 145,037, and in Norway January 28, 1926. Divided and this application filed September 29, 1927. Serial No. 222,849.

The present invention relates to refrigerating plants of the adsorption or absorption type and is a division of my present application #145,037 filed October 29, 1926, which has matured into Patent No. 1,647,208, and particularly relates to the evaporating section in a plant of this type, the principal object of the invention being to provide means whereby the introduction of non-condensed refrigerating liquid into the evaporating vessel is prevented.

This is obtained in accordance with the present invention by providing between the condenser and the evaporator a collecting tank, which communicates with the evaporating vessel by means of a conduit provided with a non-return valve which is so constructed as to open only when the pressure in the evaporating vessel is higher than the pressure in the collecting tank under which conditions vapour is allowed to escape from the evaporating tank through the liquid in the collecting vessel back to the adsorber, whereas at the same time liquid is allowed to flow from the collecting tank into the evaporator.

An embodiment of the invention will be specified under reference to the drawing which shows a diagrammatical section through a refrigerating plant.

On the drawing 1 is the vessel containing for instance a gas-adsorbing medium, said vessel comprising a number of coaxial double-walled cylinders $a$, $b$, $c$, which are filled with the said medium and which are all connected by means of tube 2 to the condensers 3. In the space between the cylinders and between the exterior cylinder $d$ and cylinder $a$ fluid for cooling or heating the adsorption medium is supplied.

4 is the collecting vessel for the refrigerating liquid which is liberated during the heating period from adsorption vessel 1, and which is subsequently condensed in the condenser 3. The said collecting vessel 4 may be provided with an insulating cover 5. 6 is the evaporator. From the bottom of the collecting vessel 4 the connecting tube 7 leads to the evaporator, said tube 7 being provided with a non-return valve 8. After the termination of the evaporating period the evaporator still contains a small quantity of refrigerating liquid. At the end of the subsequent liberating period the liquid level in the collecting vessel has risen to line H. When the evaporating period starts again a certain quantity of the refrigerating liquid in the collecting vessel is first evaporated until the pressure in this collecting vessel has decreased so much that the non-return valve 8 is lifted by means of the pressure existing in evaporating vessel 6. When said valve is lifted, vapour is let out from the evaporating vessel and at the same time refrigerating liquid from the collecting vessel H follows down into the evaporating vessel. Guides 9 limit the movement of the valve.

It is to be understood that in the following claim the term absorption is used in its generic sense, as including also the phenomenon of adsorption.

I claim:

Refrigerating plant of the absorption type comprising a condenser, an evaporator and a collecting vessel for the condensing refrigerating medium located between the condenser and the evaporator, a conduit affording the sole avenue of communication between the collecting passage and the evaporator, a single check valve opening toward the collecting vessel arranged adjacent the bottom of the collecting vessel, said valve being opened by the pressure in the evaporator when the ratio between the pressure in the evaporator and the pressure in the collecting vessel has reached a certain excess in the evaporator, so that vapor escapes from the latter to the collecting vessel, and simultaneously, by way of the same valve and through the same conduit, the refrigerating medium in the collecting vessel is allowed to flow into the evaporator.

In testimony whereof I have signed my name to this specification.

IVAR AMUNDSEN.